July 10, 1945.  W. DE VERTER  2,380,095
TUBE TESTING DEVICE
Filed June 11, 1943
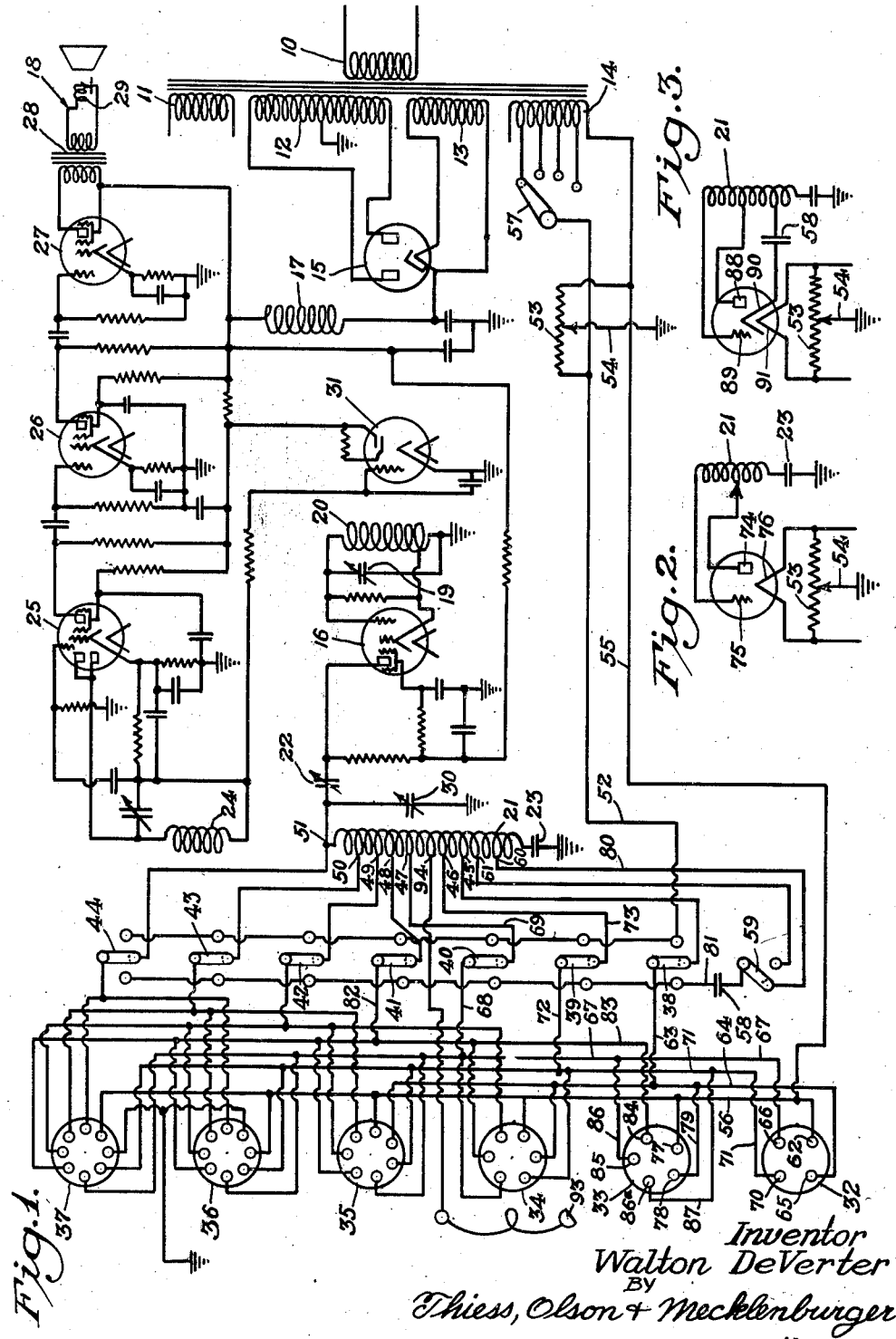
Inventor
Walton DeVerter
By
Thiess, Olson & Mecklenburger
Attorneys.

Patented July 10, 1945

2,380,095

UNITED STATES PATENT OFFICE 2,380,095

TUBE TESTING DEVICE

Walton De Verter, Oak Park, Ill., assignor of one-third to Samuel L. Brenner, Chicago, Ill.

Application June 11, 1943, Serial No. 490,413

6 Claims. (Cl. 315—368)

This invention relates to radio tube testers, more particularly to noise detectors of the type described and broadly claimed in my Patent No. 2,103,450, issued December 28, 1938, and entitled Tube testing device, and the invention has for an object the provision of improved testing devices of this character.

In my prior patent there is described a method of testing wherein the tube to be tested is coupled to a high frequency oscillator in such a manner as to operate as a rectifier and impress a normally constant load on the oscillator. As described in my patent, any fluctuations in the load caused by internal defects in the tube will be effective to modulate the oscillator current, and the modulations thus produced are caused to be reflected in a suitable indicator such as a loud speaker. More particularly, in my prior patent the various elements of the tube undergoing test are connected to a tapped inductance which is energized from the oscillator circuit, and the cathode of the tube undergoing test is heated so as to render the tube conductive, each element of the tube being connected in series circuit with the cathode to provide a rectifier action. If the tube elements forming the individual series circuits are connected directly across the tapped inductance, excessive currents may flow if the sections of the tapped inductance to which the tube elements are connected are of relatively low impedance, whereby excessive loads will be imposed on the oscillator which may result in detuning of the oscillator. Furthermore, in certain types of tubes having indirectly heated cathodes, it will be found that the various turns of the heating filament may be mechanically unbalanced so that the magnetic fields set up thereby, when energized by low frequency alternating current, will induce an alternating current hum in the high frequency voltage being used for testing purposes, which hum will of course be reflected in the indicator or loud speaker so that a satisfactory test cannot be obtained.

Accordingly, it is a further object of this invention to provide means in a testing circuit of the above indicated character for limiting the flow of current in the tube undergoing test and for balancing out any alternating current hum which would otherwise be produced by a lack of symmetry between the turns of the heating filament in an indirectly heated tube.

For a more complete understanding of the invention, reference should now be had to the drawing in which:

Fig. 1 is a circuit diagram of a tube testing device embodying the present invention;

Fig. 2 is a fragmentary circuit diagram showing the circuit connections established for testing one type of radio tube; and Fig. 3 is a similar diagram showing the circuit connections which may be established for another type of tube.

Referring now to Fig. 1, energy is supplied to the tube testing device through the usual transformer having a primary winding 10 adapted to be connected to any suitable source of alternating current and a plurality of secondary windings 11, 12, 13, and 14. The secondary windings 12 and 13 are connected, as shown, to supply a full wave rectifier tube 15 which furnishes the necessary high voltage energy for the oscillator and amplifier circuits to be hereinafter described. The secondary winding 11 is intended to supply the heating current for the cathodes of the various oscillator and amplifier tubes, the connections of the respective filaments to the secondary winding 11 being omitted in order to simplify the circuit diagram.

The tube 16 constitutes the oscillator tube for supplying the desired high frequency energy and is shown as being of the so-called electron coupled type, capable of supplying relatively heavy radio frequency loads without detuning. The oscillator is connected to the output of the rectifier tube 15 in series with the field coil 17 of the loud speaker or indicator 18, and the tuned oscillator circuit includes a suitable condenser 19 and inductance 20. Associated with the oscillator circuit is a tapped inductance 21 one end of which is connected through a suitable condenser 22 to the output circuit of the oscillator, and the other end of the inductance 21 is connected through a suitable condenser 23 to ground to complete the high frequency circuit.

Also associated with the oscillator circuit and with the inductance 21 is a suitable inductance 24 which constitutes the input circuit for the detector and amplifier stages of the indicator or loud speaker. Although any suitable radio receiver circuit may be employed, I have shown for purposes of illustration a pentode tube 25, two elements of which constitute a diode detector and the remaining elements of which serve as the first stage of audio amplification. Additional audio amplifiers 26 and 27 are provided, the output of the amplifier 27 being connected, as shown, through a suitable transformer 28 to the voice coil 29 of the indicator or loud speaker 18.

In operation the detector circuit associated with the amplifier and the loud speaker 18 is tuned to resonance with the oscillator circuits. Likewise, in order to tune the tapped inductance 21, which forms the radio frequency input to the testing circuits, a suitable variable condenser 30 is provided, and in order to insure accurate tuning a suitable tuning-eye tube 31 may be provided if desired.

Associated with the tapped inductance 21 in the testing circuit are a plurality of conventional tube sockets 32, 33, 34, 35, 36, and 37 for receiving various types of tubes having different numbers of elements, and a plurality of three-position switches 38, 39, 40, 41, 42, 43, and 44 are provided for insuring proper connection of the tube sockets to the various taps on the inductance 21. As shown, the center contacts of the switches 38 to 44, inclusive, are respectively connected to suitable taps 45 to 51 on the inductance 21. The right-hand contact on each of the switches 38 to 44, inclusive, is connected, as shown, through a conductor 52, to one side of a potentiometer comprising a resistor 53 and a slidable contact 54, which slidable contact is connected to ground. The other side of the potentiometer resistor 53 is connected through a conductor 55 and a common conductor or bus bar 56 to one socket element of each of the sockets 32 to 37, inclusive. The connections thus provided are for the purpose of heating the cathodes of the tubes to be tested, and as shown the potentiometer is adapted to be energized from the secondary 14 of the input transformer, a suitable multiple position switch 57 being provided for controlling the voltage supplied to the heating circuits.

In order to adapt the testing device for the testing of either audio frequency or radio frequency tubes, means are provided for controlling the potential applied to the cathode of the tube undergoing test. Thus the left-hand contact of each of the switches 38 to 44 is connected through a suitable condenser 58 to the movable contact of a two-position switch 59, the left-hand contact of which is connected to a tap 60 on the inductance 21 and the right-hand contact of which is connected to a higher voltage tap 61 on the inductance.

In order to describe the operation of the testing device, it will first be assumed that a three-element tube of the directly heated type is inserted in the socket 32 for testing and that the oscillator, amplifier and testing circuits are tuned to resonance at the oscillator frequency. When the switch 38 is moved to its right-hand position, it will be observed that the cathode of the tube will be heated through a circuit which extends from the socket element 62, the bus bar 56 and the conductor 55 to one side of the potentiometer resistor 53, and from the other side of the potentiometer resistor by way of the conductor 52, the switch 38, a conductor 63, and a bus bar or conductor 64 to the socket element 65. The grid or control element of the tube will be connected by way of the socket element 66, a conductor or bus bar 67, a conductor 68, the switch 40 which is in its center position, and by way of a conductor 69 to the tap 47 on the inductance 21. Similarly, the plate of the tube undergoing test will be connected by way of a socket element 70, a conductor or bus bar 71, a conductor 72, the switch 39 which is in its center position, and a conductor 73 to the tap 46 on the inductance 21. Thus the circuits are established which are shown diagrammatically in Fig. 2, the plate of the tube undergoing test being indicated by the reference numeral 74, the grid by the reference numeral 75, and the cathode by the reference numeral 76.

It will be observed that the plate 74 and the grid or control electrode 75 of the tube undergoing test are each connected in an individual series circuit with the cathode 76 across portions of the inductance 21 so as to be energized with high frequency energy supplied to the inductance from the oscillator, and the condenser 23 is interposed in these series circuits so as to limit the flow of current therethrough. Consequently excessive load on the order of magnitude of a short circuit is avoided, and any modulation of the high frequency current, due to defective tube structure, leakage between the elements, irregular electron emission or other factors which tend to make the tube noisy, will effect variations in the voltage developed across the coil 21, which variations, being reflected in the detector coil 24, will be demodulated by the detector, amplified and reproduced in the indicator or loud speaker 18.

If the tube to be tested is of the indirectly heated type having a heating filament, an anode, a cathode and a control electrode or grid, such a tube may be inserted, for example, in the socket 33, whereupon the circuit connections indicated diagrammatically in Fig. 3 will be established. Thus the socket element 77, to which one side of the filament is connected, will be connected through the bus bar 56 and the conductor 55 to one side of the potentiometer resistor 53, and a socket element 78, to which the other side of the filament is connected, will be connected through a conductor 79, a bus bar 64, a conductor 63, the switch 38 which now occupies its right-hand position, and the conductor 52 to the other side of the potentiometer resistor.

In order to connect the cathode of the tube being tested to a desired high frequency potential, the switch 41 is operated to its left-hand position and the switch 59 may be moved to connect the cathode to either of the taps 60 or 61, depending upon wheher the tube is an audio frequency or a radio frequency tube. In the drawing, the switch 59 is shown in its left-hand position, and it will be assumed that the tube undergoing test is an audio frequency tube which should properly be connected to the tap 60. From the tap 60 the circuit may be traced through the conductor 80, the left-hand contact of the switch 59, the condenser 58, the bus bar 81, the left-hand contact of the switch 41, a conductor 82, and a bus bar 83 to the socket element 84 of the socket 33. The grid or control element of the tube undergoing test which is connected to the element 85 will now be connected through a conductor 86 and the bus bar 67, the conductor 68, the switch 40 which is in its center position, and the conductor 69 to the tap 47 on the inductance 21. Similarly, the plate of the tube is connected through the socket element 86a, a conductor 87, the bus bar 71, the conductor 72, the switch 39 which is in its center position, and the conductor 73 to the tap 46 on the inductance 21.

In Fig. 3 the plate of the tube undergoing test is indicated by the reference numeral 88, the grid by the reference numeral 89, the cathode by the reference numeral 90, and the filament by the reference numeral 91, and it will be observed that the plate and grid are connected in individual series circuits with the cathode 90 across portions of the inductance 21 and through the condenser 58. Thus as described in connection with Fig. 2, low impedance loads on the inductance 21 will be avoided, the condenser 58 limiting the flow of current through the individual series circuits.

It has been found in connection with indirectly heated tubes that the filament windings may often be out of mechanical balance, so that one turn of the filament does not cancel out the magnetic field of an adjacent turn when the filament is heated from the usual 60 cycle source. Consequently, the cathode, which is disposed in the magnetic field of the filament, may have induced therein a 60 or 120 cycle hum, and this hum will of course be imposed on the high frequency voltage to which the tube elements are subjected by reason of their connection to the inductance 21. This alternating current hum, which would of course appear in the loud speaker 18, may be minimized or eliminated by adjusting the slidable contact 54 of the potentiometer so as to bring back into substantial balance the magnetic fields produced by the separate turns of the filament. When directly heated tubes are being tested no adjustment of the potentiometer is necessary, but since the cathode is connected directly across the potentiometer, as shown in Fig. 2, the testing operation is not affected by the inclusion of the potentiometer in the circuit.

It will of course be apparent that the additional tube testing sockets 34, 35, 36, and 37 are intended for use with tubes having a larger number of elements, and the circuit connections for the various elements in these tubes may be established in the same manner as heretofore described in connection with Figs. 2 and 3. For use with tubes of the type having a top contact, the testing circuit is provided with a suitable cap or clip 93 which is connected, as shown, to a tap 94 on the inductance 21.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a tube testing device of the type comprising a high frequency oscillator for supplying oscillations of constant frequency coupled to a testing circuit and indicator means coupled to respond to fluctuations in the load imposed on said oscillator by said testing circuit, the combination of means in said testing circuit for connecting the cathode element of the tube under test in individual series circuits with other elements of the tube and for connecting said tube elements for energization at high frequency potentials supplied by said oscillator, means for heating said cathode to render said series circuits conductive, and means for limiting the flow of current in said individual series circuits to prevent variations in frequency of said oscillator.

2. In a tube testing device of the type comprising a high frequency oscillator for supplying oscillations of constant frequency coupled to a testing circuit and indicator means coupled to respond to fluctuations in the load imposed on said oscillator by said testing circuit, the combination of a tapped inductance in said testing circuit energized by said oscillator, means for connecting the cathode element of the tube under test in individual series circuit with other elements of said tube and with selected taps on said inductance, means for heating said cathode to render said series circuits conductive, and means for limiting the flow of current in said series circuits to prevent variations in frequency of said oscillator.

3. In a tube testing device of the type comprising a high frequency oscillator for supplying oscillations of constant frequency coupled to a testing circuit and indicator means coupled to respond to fluctuations in the load imposed on said oscillator by said testing circuit, the combination of a tapped inductance in said testing circuit energized by said oscillator, means for selectively connecting the cathode of the tube under test to taps on said inductance having high frequency potentials corresponding to the normal characteristics of said tube, means for connecting other elements of said tube to other taps on said inductance to form individual series circuits with said cathode, means for heating said cathode, and means for limiting the flow of current in said series circuits to prevent variations in frequency of said oscillator.

4. In a tube testing device of the type comprising a high frequency oscillator for supplying oscillations of constant frequency coupled to a testing circuit and indicator means coupled to respond to fluctuations in the load imposed on said oscillator by said testing circuit, the combination of means in said testing circuit for connecting the cathode element of the tube under test in individual series circuits with other elements of the tube and for connecting the tube elements in the output circuit of said oscillator, means for connecting the filament of said tube in a heating circuit, means for limiting the flow of current in said individual series circuits to prevent variations in frequency of said oscillator, and means for balancing said heating circuit to minimize the effect on said cathode of unbalanced magnetic fields produced by said filament.

5. In a tube testing device of the type comprising a high frequency oscillator for supplying oscillations of constant frequency coupled to a testing circuit and indicator means coupled to respond to fluctuations in the load imposed on said oscillator by said testing circuit, the combination of a tapped inductance in said testing circuit coupled to said oscillator, means for connecting the cathode element of said tube under test in individual series circuits with other elements of said tube to selected taps on said inductance whereby selected high frequency potentials are impressed on said series circuits, means for connecting the filament of said tube in a heating circuit to render said series circuits conductive, means for limiting the flow of current in said individual series circuits to prevent variations in frequency of said oscillator, and potentiometer means in said heating circuit for minimizing the effect on said cathode of unbalanced magnetic fields produced by said filament.

6. A tube testing device comprising an electron coupled high frequency oscillator for supplying oscillations of constant frequency, a testing circuit arranged for electrical connection thereto of the elements of the tube under test, means coupling said testing circuit to said oscillator to supply different high frequency potentials to corresponding tube elements, means for heating the cathode element of said tube to render said tube conductive and load said oscillator, means for limiting the flow of current through said tube and said coupling means to prevent variations in said oscillator frequency, and indicator means coupled to said oscillator and testing circuit to respond to fluctuations in load caused by defects in said tube.

WALTON DE VERTER.